United States Patent
Seo et al.

(10) Patent No.: US 11,031,859 B2
(45) Date of Patent: Jun. 8, 2021

(54) DEVICE FOR STABILIZING DIRECT CURRENT (DC) DISTRIBUTION SYSTEM

(71) Applicant: LG Electronics Inc., Seoul (KR)

(72) Inventors: Mun Seok Seo, Seoul (KR); Seongju Kim, Seoul (KR); Joonsik An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/737,994

(22) Filed: Jan. 9, 2020

(65) Prior Publication Data

US 2020/0144902 A1 May 7, 2020

Related U.S. Application Data

(63) Continuation of application No. 16/132,685, filed on Sep. 17, 2018, now Pat. No. 10,554,114.

(51) Int. Cl.
*H02M 1/088* (2006.01)
*H02P 27/08* (2006.01)
*H02M 1/44* (2007.01)
*H02M 1/08* (2006.01)
*H02M 3/156* (2006.01)
*H02M 7/48* (2007.01)
(Continued)

(52) U.S. Cl.
CPC ........... *H02M 1/088* (2013.01); *H02M 1/083* (2013.01); *H02M 1/44* (2013.01); *H02M 3/156* (2013.01); *H02M 7/48* (2013.01); *H02P 27/08* (2013.01); *H02J 1/00* (2013.01); *H02M 2001/0058* (2013.01); *H02M 2003/1566* (2013.01); *H02P 27/06* (2013.01)

(58) Field of Classification Search
CPC .............................. H02M 1/088; H02P 27/08
USPC .................................................. 318/504, 494
See application file for complete search history.

(56) References Cited

U.S. PATENT DOCUMENTS 6,856,112 B2    2/2005  Ohshima
7,122,991 B2 *  10/2006 Kitajima ................. B60L 58/18
                                                            318/800
(Continued)

FOREIGN PATENT DOCUMENTS

JP      2014-138477       7/2014
KR      10-2012-0077179 A  7/2012

OTHER PUBLICATIONS

Kwak et al., "Performance Analysis of High Efficiency DC-DC Chopper added in Electric Isolation", *The Korean Institute of Power Electronics*, 2007, 115-117.
(Continued)

*Primary Examiner* — David Luo
(74) *Attorney, Agent, or Firm* — Finnegan, Henderson, Farabow, Garrett & Dunner, LLP

(57) ABSTRACT

A device for stabilizing a direct current (DC) distribution system includes a capacitor unit charged by a DC voltage supplied by a power supply stage of the distribution system. The device further includes an inverter that has three pair of switching elements. The device also includes a controller that controls a plurality of switches thereof to selectively enable an inverter circuit or a voltage stabilizing circuit of the DC distribution system. The device alleviates instability of DC voltage which may be generated in a transient period, or to drive a motor connected to the device.

19 Claims, 15 Drawing Sheets

(51) Int. Cl.
*H02M 1/00* (2006.01)
*H02J 1/00* (2006.01)
*H02P 27/06* (2006.01)

(56) References Cited

U.S. PATENT DOCUMENTS 7,847,499 B2 * 12/2010 Nakamura ........ H02M 7/53873
318/400.27
9,774,215 B2 * 9/2017 Mizuno ................. B60L 3/0092

OTHER PUBLICATIONS

Korean Notice of Allowance of KR 10-2017-0128279 dated Feb. 18, 2019.

* cited by examiner

DEVICE FOR STABILIZING DIRECT CURRENT (DC) DISTRIBUTION SYSTEM

CROSS REFERENCE TO RELATED APPLICATION

This application is a continuation of U.S. patent application Ser. No. 16/132,685, filed on Sep. 17, 2018, which claims the benefit of priority of Korean Patent Application No. 10-2017-0128279, filed on Sep. 29, 2017, entitled "APPARATUS FOR STABILIZING DC DISTRIBUTION SYSTEM", the contents of all of which are hereby incorporated by reference herein in their entireties.

TECHNICAL FIELD

The present disclosure relates to a device for stabilizing a direct current (DC) distribution system, in which the device controls a plurality of switches thereof to selectively enable an inverter circuit or a voltage stabilizing circuit thereof, thereby to alleviate instability of DC voltage which may be generated in a transient period or to drive a motor connected to the device.

RELATED ART

A direct current (DC) distribution system is free of a reactance component, and, thus, suffers from no loss due to a reactive power. Further, the direct current (DC) distribution system is free of a frequency property and, thus, suffers from no skin effect. Therefore, the DC distribution system is advantageous in that a distribution efficiency thereof is higher than that of an AC distribution system.

In recent years, renewable energy generation is being commercialized, and high efficiency-based power conversion devices and DC loads, etc. are developed. For this reason, the direct current (DC) distribution system is in the spotlight.

The direct current (DC) distribution system may include a power supply stage, a distribution stage, and a load stage. A DC voltage power supply stage voltage from the power supply stage may be applied via the distribution stage to each load connected to the load stage.

However, when a large number of loads are connected to the direct current (DC) distribution system, the power supply stage voltage instability occurs due to interaction between a power conversion device included in the load and the system. In particular, when the load is connected to or removed from the direct current (DC) distribution system, the instability of the power supply stage voltage occurs at a transient period.

FIGS. 1 and 2 show waveforms of the power supply stage voltage occurring in the transient period immediately after the load is connected to or removed from the DC distribution system.

First, referring to FIG. 1, when the load is connected to the direct current (DC) distribution system, the power supply stage voltage $V_{BUS}$ may reduce instantaneously. The reduced power supply stage voltage $V_{BUS}$ oscillates for a predetermined time, and then returns to a normal state after the transient period.

Second, referring to FIG. 2, when the load is removed from the direct current (DC) distribution system, the power supply stage voltage $V_{BUS}$ may increase instantaneously. The increased power supply stage voltage $V_{BUS}$ oscillates for a predetermined time, and then returns to a normal state after the transient period.

The oscillation in the transient period produces a frequency component in the power supply stage voltage. The generated frequency component adversely affects the direct current (DC) distribution system. Accordingly, a device voltage stabilization device for stabilizing the power supply stage voltage in the transient period has been developed.

Conventional voltage stabilizers, however, are configured separately from loads connected to the direct current (DC) distribution system. Therefore, the conventional stabilization devices have a problem that the operation efficiency thereof may be low and the production cost thereof may not be reduced.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure aims to provide a device for stabilizing the direct current (DC) distribution system, in which the device is configured to stabilize a DC power supplied from the power supply stage of the DC power distribution system.

Further, the present disclosure aims to provide a device for stabilizing the direct current (DC) distribution system, in which the device is included in the load and is configured to drive a motor or relieve instability of the DC voltage generated in the transient period depending on an operation mode thereof.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

To this end, in accordance with the present disclosure, there is provided a device for stabilizing a direct current (DC) distribution system, wherein the system includes a power supply stage, the device comprising: a capacitor unit including a first capacitor and a second capacitor, wherein the first and second capacitors are coupled in series to each other, wherein the capacitor unit is coupled in parallel with the power supply stage such that the first and second capacitors are charged by a DC voltage supplied from the power supply stage; an inverter unit including two pairs of driving switching elements and a pair of common switching elements, wherein the inverter unit is configured to convert the voltage charged in the capacitor unit into an AC power and to provide the AC power to a motor connected to the device; a voltage stabilization unit including the pair of common switching elements, wherein the voltage stabilization unit is configured to control the common switching elements based on a charging or discharging signal to charge the capacitor unit with the DC voltage supplied from the power supply stage or to discharge the voltage charged in the capacitor unit to the power supply stage; a switching unit including a plurality of switches, wherein the plurality of switches of the switching unit is configured to selectively enable the inverter unit or the voltage stabilization unit; and a control unit configured to compare the DC voltage supplied from the power supply stage with a reference range, and to provide the charging or discharging signal to the voltage stabilization unit based on the comparison result.

In one embodiment, the power supply stage is connected to a DC power supply for outputting the DC voltage or to a converter for converting an AC power supply to the DC voltage.

In one embodiment, the plurality of switches of the switching unit includes: a first switch for connecting said one pair of common switching elements and the two pair of driving switching elements; a second switch for connecting a first node between said one pair of common switching elements and the motor; a third switch for connecting a second node between the first capacitor and the second capacitor and the first node; and a fourth switch for selectively connecting a positive terminal of the first capacitor or the second node to the power supply stage.

In one embodiment, the switching unit is configured to turn on the first switch and the second switch and turn off the third switch, and to control the fourth switch so that the positive terminal of the first capacitor is selectively connected to the power supply stage, thereby to selectively enable the inverter unit.

In one embodiment, the switching unit is configured to turn off the first switch and the second switch and turn on the third switch, and to control the fourth switch so that the second node is selectively connected to the power supply stage, thereby to selectively enable the voltage stabilization unit.

In one embodiment, the control unit is configured to supply a switching signal to the switching unit to control turn-on or turn-off of the plurality of switches.

In one embodiment, the voltage stabilization unit includes a charging and discharging inductor, wherein the charging and discharging inductor has one end connected to a first node between said one pair of common switching elements and the other end connected to a second node between the first capacitor and the second capacitor.

In one embodiment, the voltage stabilization unit is configured to charge the first capacitor with a current stored in the charging and discharging inductor or to discharge the voltage charged in the first capacitor to the power supply stage through the charging and discharging inductor.

In one embodiment, said one pair of common switching elements performs turn-on or turn-off based on the charging or discharging signal.

In one embodiment, said pair of common switching elements are configured to perform zero voltage switching (ZVS) based on the charging or discharging signal.

In one embodiment, the control unit is configured to receive a measured value of the DC voltage from a voltage sensor and to compare the received measured value with the reference range.

In one embodiment, when the DC voltage exceeds the reference range, the control unit is configured to provide a charging signal to the voltage stabilization unit, wherein when the DC voltage is smaller than the reference range, the control unit is configured to provide a discharging signal to the voltage stabilization unit.

In one embodiment, the device further comprises an auxiliary voltage stabilization unit, wherein the auxiliary voltage stabilization unit includes a pair of auxiliary switching elements, a filter inductor, a charging and discharging capacitor, and a filter capacitor, wherein the auxiliary voltage stabilization unit is connected in parallel with the power supply stage, wherein the auxiliary voltage stabilization unit is configured, based on an auxiliary charging or discharging signal, to charge the charging and discharging capacitor with the DC voltage supplied from the power supply stage or to discharge the charged voltage from the charging and discharging capacitor to the power supply stage.

In one embodiment, the control unit is configured to compare the DC voltage supplied from the power supply stage with the reference range, and to provide the auxiliary charging or discharging signal to the auxiliary voltage stabilization unit based on the comparison result.

In one embodiment, the auxiliary voltage stabilization unit is configured to charge the charging and discharging capacitor with a current stored in the filter inductor or to discharge a voltage charged in the charging and discharging capacitor to the power supply stage through the filter inductor.

In one embodiment, the control unit is configured to provide a driving signal to the inverter unit, wherein the driving signal is configured for controlling turning on or off of the two pairs of driving switching elements and the pair of common switching elements.

According to the present disclosure, by stabilizing the DC power supplied from the power supply stage of the distribution system, the system efficiency degradation due to voltage instability as otherwise caused when the load is connected to or removed from the direct current (DC) distribution system may be suppressed. Further, as the peak voltage decreases, a component having a lower rated voltage may be used, which may improve the compatibility of the device.

Further, according to the present disclosure, the stabilizing device is included in the load to drive the motor or relieve instability of the DC voltage generated in a transient period based on the operational mode. Thus, the device may be easily implemented, and two functions may be performed by the single device. Thus, the efficiency of the device may be improved.

DETAILED DESCRIPTIONS

Figure 1:
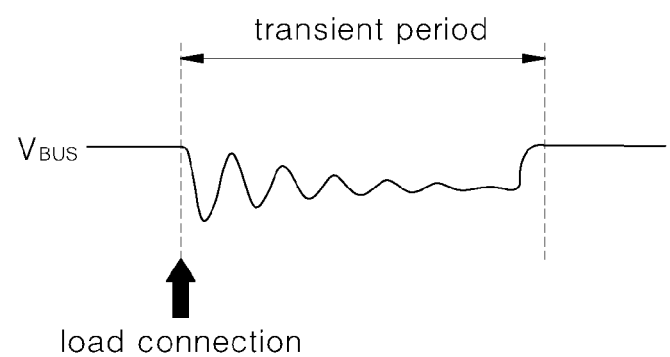
FIG. 1 and FIG. 2 show waveforms of the power supply stage voltage occurring in the transient period immediately after the load is connected to or removed from the DC distribution system.
Figure 2:
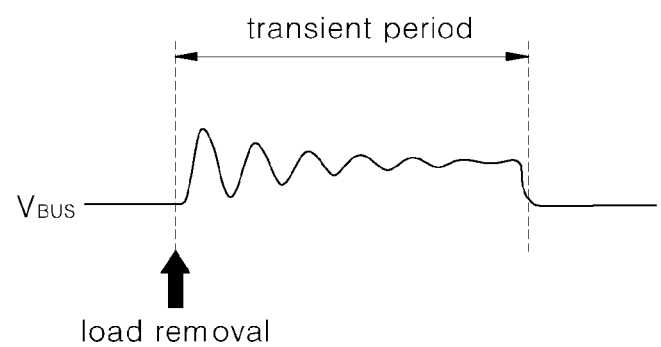

The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A device for stabilizing the direct current (DC) distribution system according to the present disclosure may be included in a load connected to a direct current (DC) distribution system. More specifically, the device for stabilizing the direct current (DC) distribution system may be included in the load using a three-wire inverter to drive the motor.

Hereinafter, the device for stabilizing the direct current (DC) distribution system according to an embodiment of the present disclosure and each component constituting the device will be described in detail with reference to FIG. 3 to FIG. 7.

Figure 3:
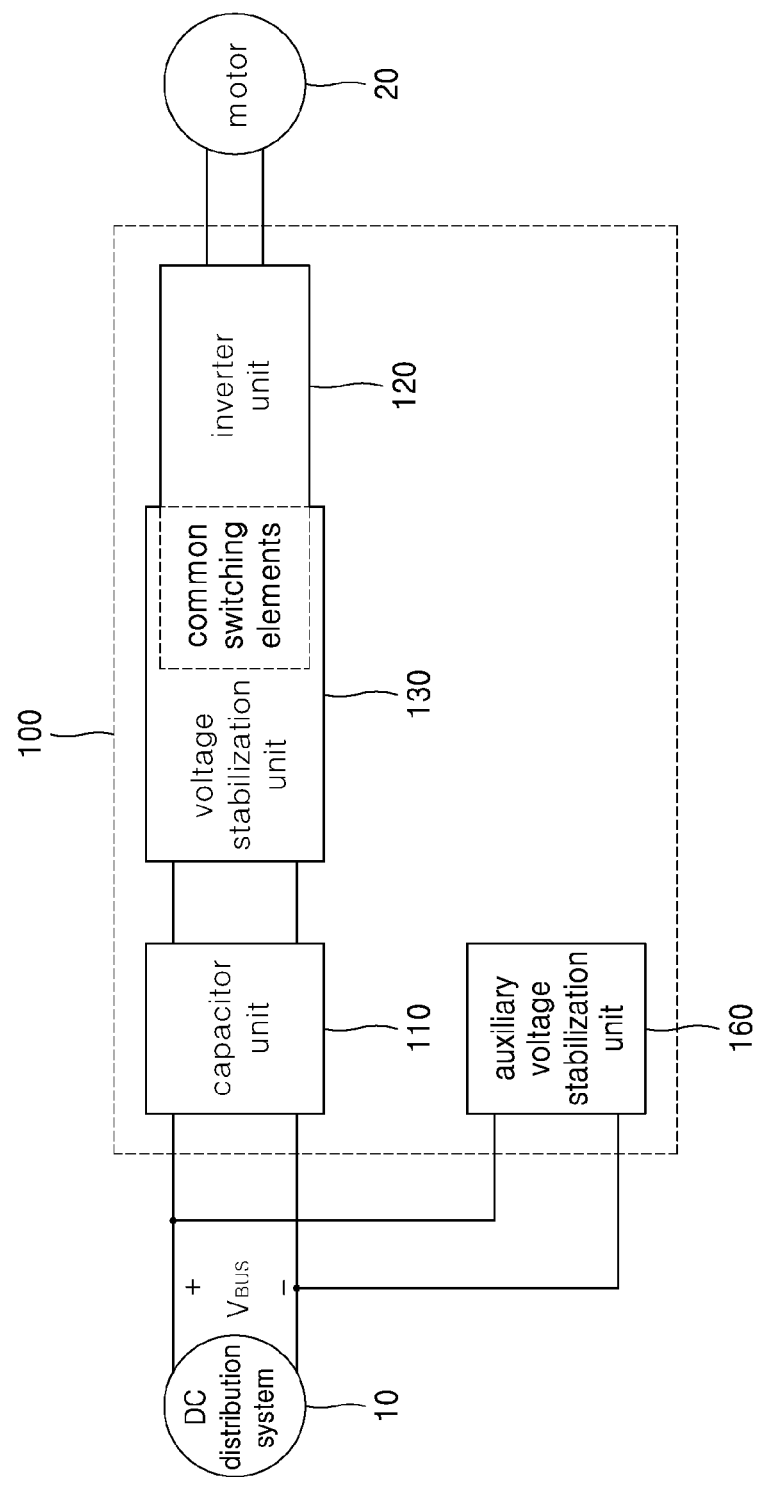
FIG. 3 shows that a device for stabilizing the direct current (DC) distribution system is connected to the DC distribution system and a motor, according to one embodiment of the present disclosure.
Figure 4:
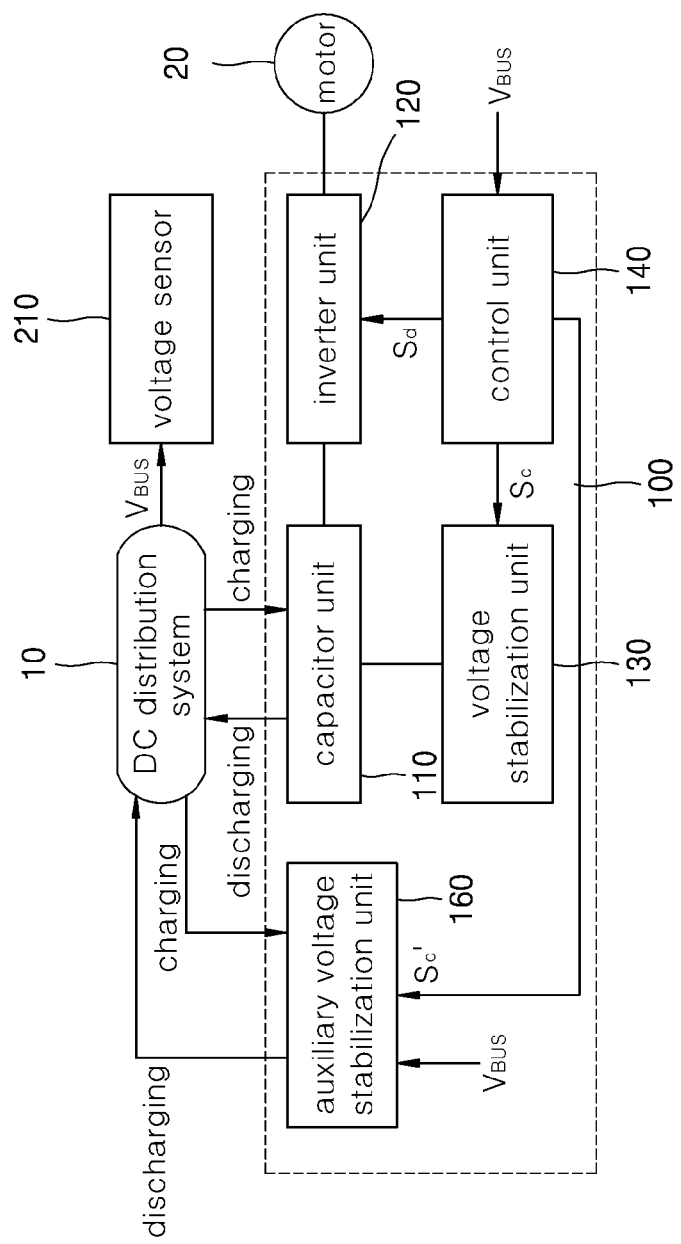
FIG. 4 shows a control flow chart of the device to stabilize the direct current (DC) distribution system shown in FIG. 3

FIG. 3 shows that a device for stabilizing the direct current (DC) distribution system is connected to the DC distribution system and a motor, according to one embodiment of the present disclosure. FIG. 4 shows a control flow chart of the device to stabilize the direct current (DC) distribution system shown in FIG. 3.

Figure 5:
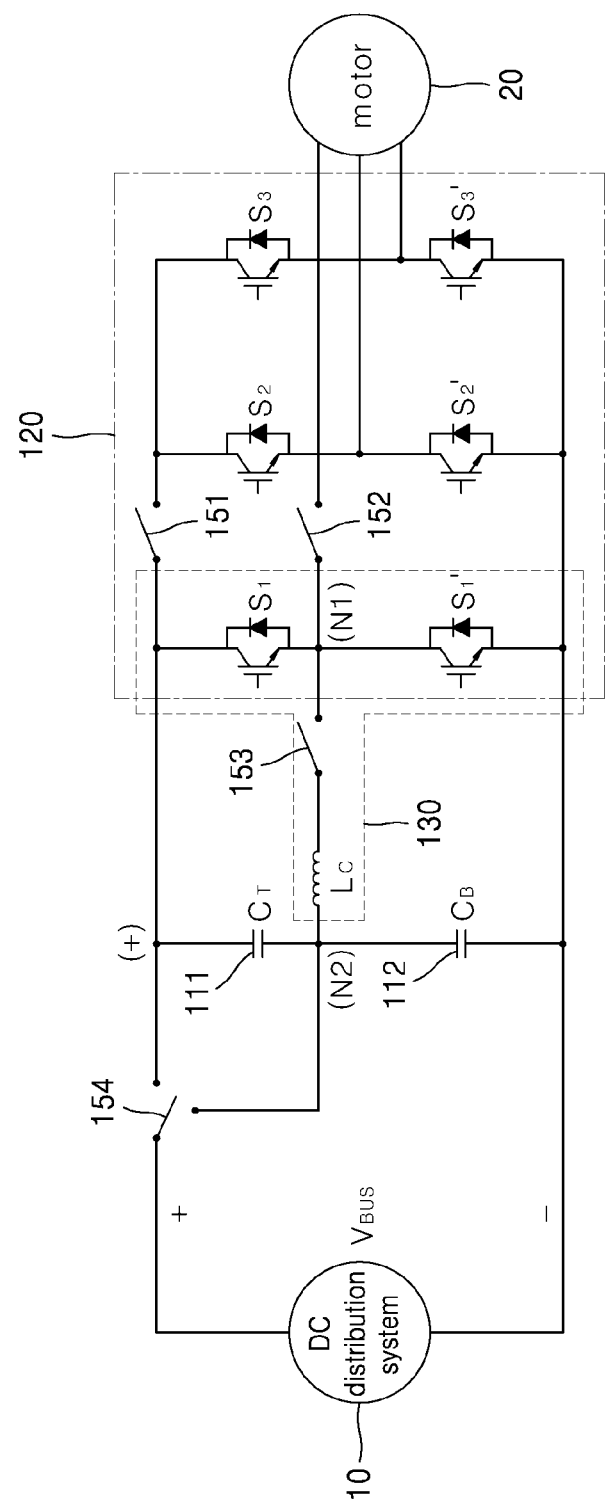
FIG. 5 is a circuit diagram of the device to stabilize the direct current (DC) distribution system shown in FIG. 3.

FIG. 5 is a circuit diagram of the device to stabilize the direct current (DC) distribution system shown in FIG. 3.

Figure 6:
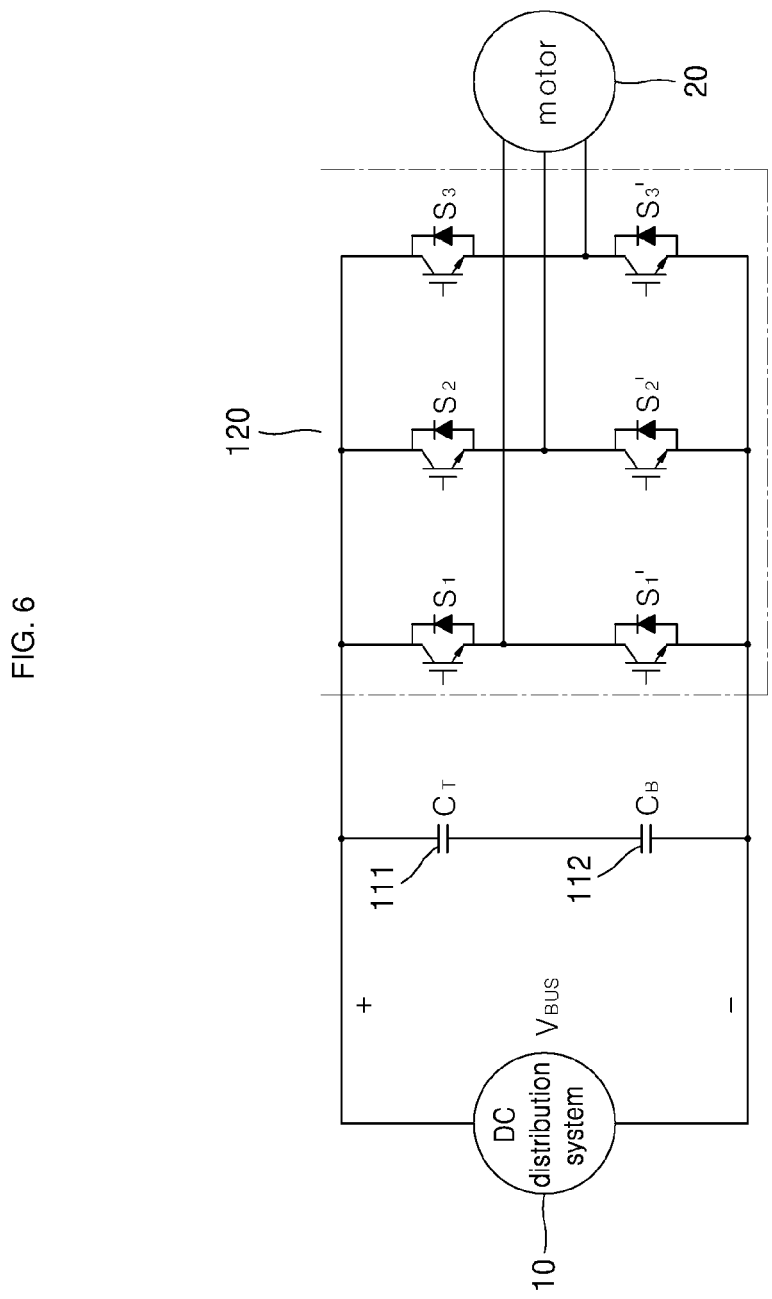
FIG. 6 shows a state in which an inverter circuit of the device stabilizing the direct current (DC) distribution system shown in FIG. 5 is enabled, based on an operating state of a switch.
Figure 7:
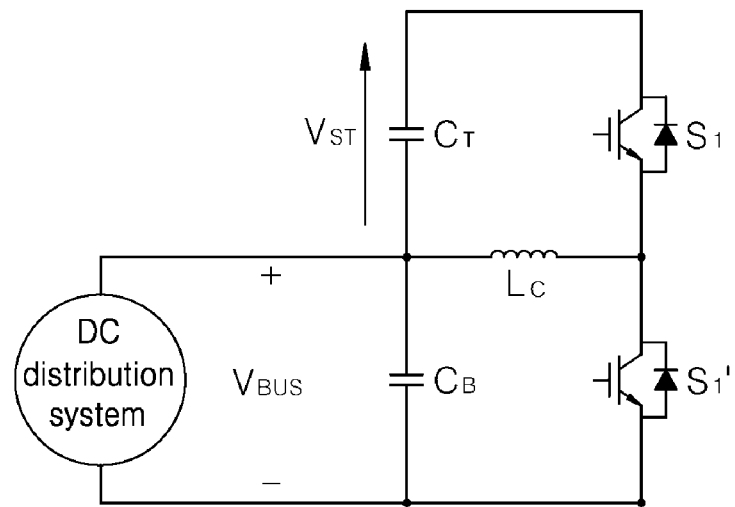
FIG. 7 shows a state in which a voltage stabilization circuit of the device stabilizing the direct current (DC) distribution system shown in FIG. 5 enabled, based on an operating state of a switch.

FIG. 6 shows a state in which an inverter circuit of the device stabilizing the direct current (DC) distribution system shown in FIG. 5 is enabled, based on an operating state of a switch. FIG. 7 shows a state in which a voltage stabilization circuit of the device stabilizing the direct current (DC) distribution system shown in FIG. 5 is enabled, based on an operating state of a switch.

Referring to FIG. 3 and FIG. 4, the device 100 for stabilizing the direct current (DC) distribution system according to an embodiment of the present disclosure may include a capacitor unit 110, an inverter unit 120, a voltage stabilization unit 130, a switching unit 150 (not shown), a control unit 140, and an auxiliary voltage stabilization unit 160.

The device 100 for stabilizing the direct current (DC) distribution system shown in FIG. 3 and FIG. 4 is merely one embodiment. The components of the device are not limited to those of the embodiment shown in FIG. 3 and FIG. 4. As required, some of the components may be added, changed or deleted.

Referring to FIG. 3 and FIG. 5, the capacitor unit 110 may include a first capacitor $C_T$ 111 and a second capacitor $C_B$ 112 as charged by a DC voltage $V_{BUS}$ supplied from the power supply stage of the DC distribution system.

In this connection, the power supply stage may be included in the DC distribution system 10 that supplies the DC voltage $V_{BUS}$ to the device 100. The DC power distribution system 10 may be connected to a DC power source or an AC power source to supply the DC voltage $V_{BUS}$ to the device 100 for stabilizing the direct current (DC) distribution system.

For example, the DC power distribution system 10 may be connected to a DC power source that outputs a DC voltage $V_{BUS}$ thereto. Alternatively, the DC power distribution system 10 may be coupled to an output of a converter that converts an alternating current power to the DC voltage $V_{BUS}$.

In other words, the power supply stage may be connected to a DC power source that outputs the DC voltage $V_{BUS}$. Alternatively, the power supply stage may be coupled to the output of the converter, which converts the AC power to a DC voltage $V_{BUS}$.

The capacitor unit 110 may act as a DC-link capacitor unit configured to store a DC voltage $V_{BUS}$ supplied from the power supply stage and to supply the DC voltage to the inverter unit 120, which will be described later.

The first capacitor $C_T$ and the second capacitor $C_B$ constituting the capacitor unit 110 may store a voltage of a predetermined magnitude based on capacitance thereof.

When the power supply stage is connected to the output terminal of the converter for converting AC power into DC voltage $V_{BUS}$, the capacitor unit 110 may smooth the DC voltage $V_{BUS}$ output from the converter and provide the smoothed voltage to the inverter unit 120 to be described later.

The inverter unit 120 may be implemented as a three-wire inverter. In this case, the inverter unit may include three pairs of switching elements S1 to S3 and S1' to S3'. The three pairs of switching elements S1 to S3 and S1' to S3' may be composed of two pairs of driving switching elements S2 and S2', S3 and S3' and a pair of common switching elements S1 and S1'.

Meanwhile, the switching element included in the inverter unit 120 may include a MOSFET (Metal Oxide Semiconductor FET) or an IGBT (Insulated Gate Bipolar Transistor) as the power switching element.

The inverter unit 120 converts the voltage charged in the capacitor unit 110 into AC power using the two pairs of driving switching elements S2 and S2', S3 and S3' and the pair of common switching elements S1 and S1'. Then, the converted voltage may be supplied to the motor 20.

In this connection, the driving switching elements may not be specific switching elements, but may be any two pairs of the three pairs of switching elements S1 to S3 and S1' to S3'. Accordingly, the common switching elements may be one pair of switching elements other than the driving switching elements among the three pairs of the switching elements S1 to S3 and S1' to S3'.

The voltage stabilization unit 130 may include the pair of common switching elements S1 and S1'. More specifically, as shown in FIG. 5, the inverter unit 120 as described above and the voltage stabilization unit 130 may share the pair of common switching elements S1 and S1'. In other words, the common switching elements S1 and S1' included in the inverter unit 120 may be included in the voltage stabilization unit 130.

The voltage stabilization unit 130 controls the pair of common switching elements S1 and S1' based on a charging or discharging signal $S_C$ to charge the capacitor unit 110 with the DC voltage $V_{BUS}$ supplied from the power supply stage or discharge the charged voltage to the power supply stage.

The voltage stabilization unit 130 may include a charging and discharging inductor $L_C$.

One end of the inductor $L_c$ may be connected to a node between a pair of the common switching elements S1 and S1' while the other end of the inductor may be connected to a node between the first capacitor $C_T$ and the second capacitor $C_B$.

The voltage stabilization unit 130 may allow charging the DC voltage $V_{BUS}$ supplied from the power supply stage through the charging and discharging inductor $L_C$ into the capacitor unit 110. Conversely, the voltage stabilization unit 130 may allow discharging the voltage charged in the capacitor unit 110 through the charging and discharging inductor $L_C$ to the power supply stage. The specific charging and discharging operation of the voltage stabilization unit 130 will be described later.

A second operation in which the inverter unit 120 provides AC power to the motor 20 to drive the motor 20, and a second operation in which the voltage stabilization unit 130 charges and discharges the capacitor unit 110 to stabilize the voltage of the power supply stage may be selectively performed by the switching unit 150 as described later.

Referring again to FIG. 5, the switching unit 150 includes a plurality of switches 151 to 154. The switching unit 150 may selectively enable the inverter unit 120 and the voltage stabilization unit 130 by controlling the operation of the switches thereof. In this connection, the plurality of switches 151 to 154 included in the switching unit 150 may be embodied as relays.

More specifically, the switching unit 150 includes a first switch 151 that connects the pair of common switching elements S1 and S1' and the two pairs of driving switching elements S2 and S2', S3, and S3' to each other, and a second switch 152 connecting a first node N1 between the pair of common switching elements S1 and S1' and the motor 20.

Further, the switching unit 150 includes a third switch 153 for connecting the second node N2 between the first capacitor $C_T$ and the second capacitor $C_B$ to the first node N1, and a fourth switch 154 for selectively connecting a positive terminal of the first capacitor $C_T$ or the second node N2 to the power supply stage Referring to FIG. 4, the control unit 140 may provide a switching signal to the switching unit 150 to control a turn-on or turn-off operation of the plurality of switches 151 to 154.

The switching signal may be preset based on the operation mode. In this connection, the operation mode may include a driving mode and a voltage stabilization mode.

Accordingly, the switching signal may include a first switching signal corresponding to the driving mode and a second switching signal corresponding to the voltage stabilization mode.

The driving mode may be a mode for selectively enabling the inverter unit 120, while the voltage stabilization mode may be a mode for selectively enabling the voltage stabilization unit 130 as described above.

More specifically, the device 100 for stabilizing the direct current (DC) distribution system may be housed in a consumer device such as an air conditioner. The air conditioner may provide an interface thereon for receiving an input signal from the user. The user may input the operational mode via the interface.

When the operational mode input by the user is the driving mode, the control unit 140 may provide the switching unit 150 with a first switching signal corresponding to the driving mode. On the other hand, when the operational mode input by the user is the voltage stabilization mode, the control unit 140 may provide the switching unit 150 with a second switching signal corresponding to the voltage stabilization mode.

First, the operation of the device 100 for stabilizing the direct current (DC) distribution system when the operational mode is the driving mode will be described in detail.

When the switching unit 150 is provided with the first switching signal, the switching unit 150 may turn on the first switch 151 and the second switch 152 and turn off the third switch 153. Further, the switching unit 150 controls the fourth switch 154 so that the positive terminal (+) of the first capacitor $C_T$ is selectively connected to the power supply stage, thereby allowing the inverter unit 120 to be selectively enabled.

Therefore, the circuit of the device 100 to stabilize the direct current (DC) distribution system, as shown in FIG. 5 may be configured as an inverter circuit, as shown in FIG. 6.

Referring to FIG. 6, the device 100 for stabilizing the direct current (DC) distribution system selectively enables only the inverter unit 120 based on the control of the switching unit 150, to drive the motor 20.

The inverter unit 120 may convert the voltage charged in the capacitor unit 110 into three pairs of driving currents having arbitrary phase differences using the three pairs of switching elements S1 to S3 and S1' to S3'.

For example, the inverter unit 120 may output three-phase alternating currents having phase differences of 120 degrees with each other using each pair of switching elements. Alternatively, the inverter unit 120 may output three-phase pulse currents having phase differences of 120 degrees with each other using each pair of switching elements.

Referring to FIG. 4, the control unit 140 may provide a driving signal $S_d$ to the inverter unit 120 in order to enable the inverter unit 120 as described above. The driving signal $S_d$ controls the turn-on or turn-off operation of the two pairs of driving switching elements S2 and S2', and S3 and S3', and the pair of common switching elements S1 and S1'.

In this connection, the driving signal $S_d$ may be a pulse width modulation (PWM) signal, or, alternatively, may be a signal of a specific frequency having a constant pulse width.

The control unit 140 may be embodied as a microcomputer (MICOM) that generates a pulse signal included in the driving signal $S_d$. Accordingly, the inverter unit 120 may include a gate driver. The gate driver receives the generated pulse signal and, in response to receiving the pulse signal, provides the driving voltage to the three switching elements S1 to S3 and S1' to S3'.

The motor 20 connected to the inverter unit 120 may be embodied as an induction motor, a brushless DC motor (BLDC), and reluctance motor. The motor 20 may be a motor provided inside a home appliance such as an air conditioner.

Next, the operation of the device 100 for stabilizing the direct current (DC) distribution system when the operational mode is the voltage stabilization mode will be described in detail.

When the switching unit 150 is provided with the second switching signal, the switching unit 150 may turn off the first switch 151 and the second switch 152, and may turn on the third switch 153. Further, the switching unit 150 may selectively enable the voltage stabilization unit 130 by controlling the fourth switch 154 so that the second node N2 selectively connects the power supply stage.

Accordingly, the device 100 circuit to stabilize the direct current (DC) distribution system shown in FIG. 5 may be configured as the voltage stabilization circuit, as shown in FIG. 7.

Referring to FIG. 7, the device 100 for stabilizing the direct current (DC) distribution system may selectively enable only the voltage stabilization unit 130, based on the control of the switching unit 150 as described above, thereby to stabilize the voltage of the power supply stage.

The pair of common switching elements S1 and S1' included in the voltage stabilization unit 130 may perform turn-on or turn-off based on the charging or discharging signal $S_C$ provided from the control unit 140, thereby to perform the function of stabilizing the voltage of the power supply stage.

Based on the switching operation of the pair of common switching elements S1 and S1', the DC voltage $V_{BUS}$ supplied from the power supply stage may be stored in the capacitor unit 110, more specifically, in the first capacitor $C_T$. Conversely, based on the switching operation of the pair of common switching elements S1 and S1', the voltage charged in the capacitor unit 110, more specifically, the first capacitor $C_T$, may be discharged to the power supply stage.

The second capacitor $C_B$ acts as a filter capacitor, which may mitigate the ripple caused by the switching action of the common switching elements S1 and S1'. Further, when each common switching element S1 and S1' performs turn-on or turn-off with a short dead time, the charging and discharging inductor $L_C$ may limit the current flow between the power supply stage and the first capacitor $C_T$.

Referring to FIG. 4, in order to enable the voltage stabilization unit 130 as described above, the control unit 140 compares the DC voltage $V_{BUS}$ supplied from the power supply stage with a reference range, and, then, based on the comparison result, supplies the charging or discharging signal $S_C$ to the voltage stabilization unit 130.

In this connection, the charging or discharging signal $S_C$ may be a pulse signal for turning on or off each common switching element S1 and S1'. The charging or discharging signal may include at least one of a charging signal and a discharging signal.

The control unit 140 may be implemented as a microcomputer for generating a pulse signal constituting the charging or discharging signal $S_C$. Accordingly, the voltage stabilization unit 130 may include a gate driver. The gate driver receives the generated pulse signal and, in response to the pulse signal, provides the driving voltage to the common switching elements S1 and S1'.

The control unit 140 receives a measured value of the DC voltage $V_{BUS}$ from the voltage sensor 210. The control unit may then compare the measured value of the direct current voltage $V_{BUS}$ with a reference value.

The voltage sensor 210 is provided in the power supply stage. The sensor may measure the DC voltage $V_{BUS}$ output from the DC distribution system 10 and provide the measured value to the control unit 140. For this purpose, the voltage sensor 210 may be embodied as a digital sensor capable of data communication.

Meanwhile, in FIG. 4, the device according to the present disclosure is shown as not including the voltage sensor 210. However, the device according to the present disclosure may include the voltage sensor 210 as described above.

The control unit 140 compares the DC voltage $V_{BUS}$ of the power supply stage with the reference value or range and generates either a charging signal or a discharging signal based on the comparison result.

In this connection, the reference range may be a range of a voltage acceptable in the transient period or, alternatively, may be determined according to the user's settings.

For example, when the DC voltage $V_{BUS}$ output from the DC distribution system 10 is preset to 10 [V], the reference range may be set within a range of +/−10% of the preset voltage. That is, the reference range may be set to 9 [V] to 11 [V].

When the measured DC voltage $V_{BUS}$ exceeds the reference range (e.g., the voltage exceeds 11 [V]), the control unit 140 may generate a charging signal and provide the generated charging signal to the voltage stabilization unit 130. On the other hand, when the measured DC voltage $V_{BUS}$ is less than the reference range (e.g., the voltage is less than 9 [V]), the control unit 140 generates a discharge signal and supplies the generated discharge signal to the voltage stabilization unit 130.

The voltage stabilization unit 130 may charge the first capacitor $C_T$ with the DC voltage $V_{BUS}$ as supplied from the power supply stage based on the charge signal provided from the control unit 140. Alternatively, the voltage stabilization unit 130 may discharge the voltage charged in the first capacitor $C_T$ to the power supply stage, based on the discharge signal provided from the control unit 140.

More specifically, the voltage stabilization unit 130 charges the first capacitor $C_T$ using the current stored in the charging and discharging inductor $L_C$, or discharges the charged voltage in the first capacitor $C_T$ to the power supply stage via the charging and discharging inductor $L_C$. The charging or discharging may be based on the charging or discharging signal $S_C$.

FIG. 8 to FIG. 11 show a circuit diagram illustrating a sequence-based operation of the voltage stabilization circuit as shown in FIG. 7. FIG. 12 is a graph showing a current of a charge and discharge inductor and a voltage of a first capacitor based on an operation procedure in FIG. 8 to FIG. 11.

Hereinafter, the charging or discharging process of the first capacitor $C_T$ according to the switching operation of the common switching elements S1 and S1' will be described in detail with reference to FIGS. 8 to 12.

The circuit as shown in FIG. 7 may be configured as circuits (mode 1 to mode 4) shown in FIG. 8 to FIG. 11 sequentially, based on the switching operation of the pair of common switching elements S1 and S1'. In this regard, a pulse signal applied to each of the common switching elements S1 and S1', a current $I_L$ flowing in the charging and discharging inductor $L_C$, and the voltage $V_{ST}$ stored in the first capacitor $C_T$ over time may be graphically shown in FIG. 12.

Figure 8:
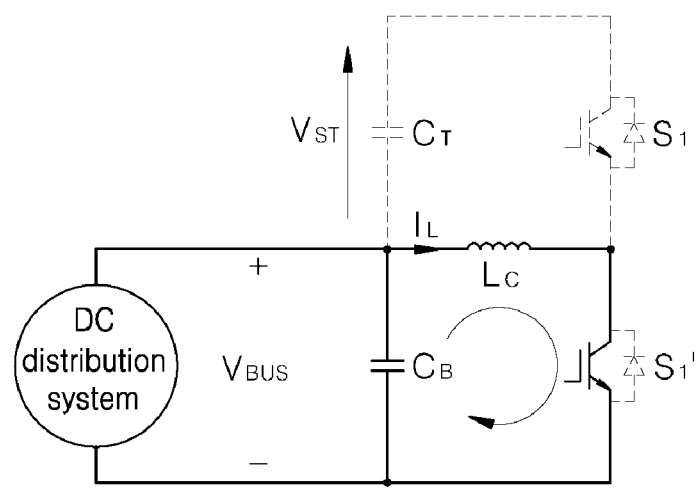
FIG. 8 to FIG. 11 show a circuit diagram illustrating a sequence-based operation of the voltage stabilization circuit as shown in FIG. 7.

More specifically, referring to FIG. 8, the voltage stabilization unit 130, in response to the charging signal, turns on the second common switching element S1' and turns off the first common switching element S1 for a predetermined time. Thus, the current $I_L$ output from the power supply stage may be stored in the charging and discharging inductor $L_C$.

Figure 9:
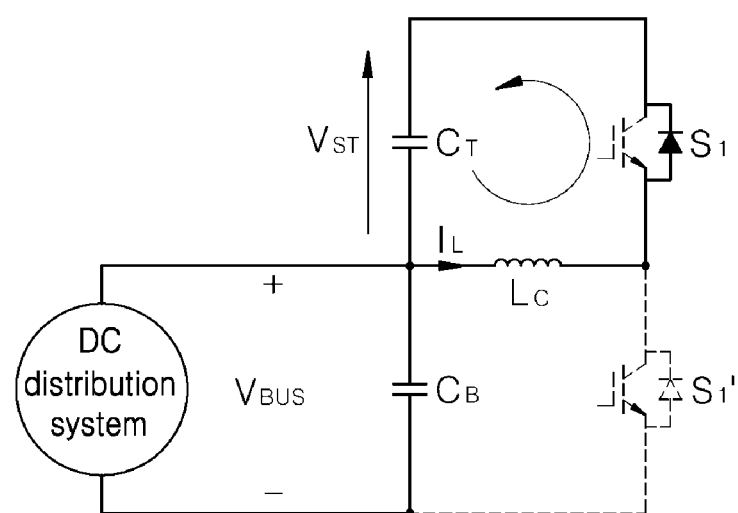

Referring to FIG. 9, after a predetermined time has elapsed, the voltage stabilization unit 130 may turn off the common switching elements S1 and S1' for a dead time $t_d$. Thus, the current stored in the charging and discharging inductor $L_C$ may be provided to the first capacitor $C_T$ through a diode of the first common switching element S1 in the conducting state. Thus, the first capacitor $C_T$ may be charged by the current.

By forming the path of the current through the diode for the dead time $t_d$, the first common switching element S1, which is subsequently turned on, may perform zero voltage switching (ZVS).

More specifically, the current flowing through the diode may gradually decrease. Thus, before the direction of the current is switched to the positive direction of the first common switching element S1 (the reverse direction of the diode), the voltage applied across the first common switching element S1 may be zero.

When the voltage across the first common switching element S1 is zero, the first common switching element S1 is turned on. Thus, the first common switching element S1 may perform the zero voltage switching operation, thereby reducing the switching loss.

Figure 10:
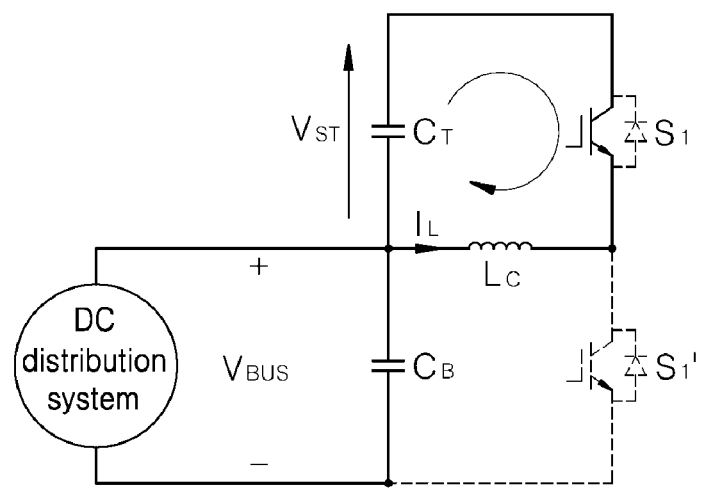

Referring to FIG. 10, in response to the discharge signal, the voltage stabilization unit 130 may turn on the first common switching element S1 and turn off the second common switching element S1' for a preset time. Thus, the voltage charged in the first capacitor $C_T$ may be provided to the power supply stage through the charging and discharging inductor $L_C$.

Figure 11:
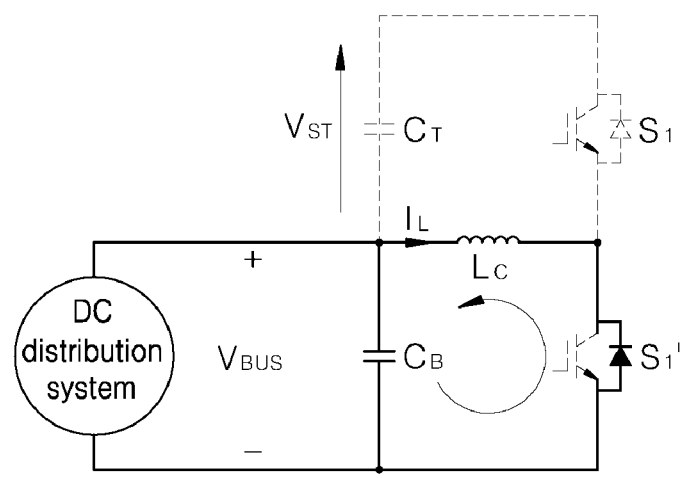
Figure 12:
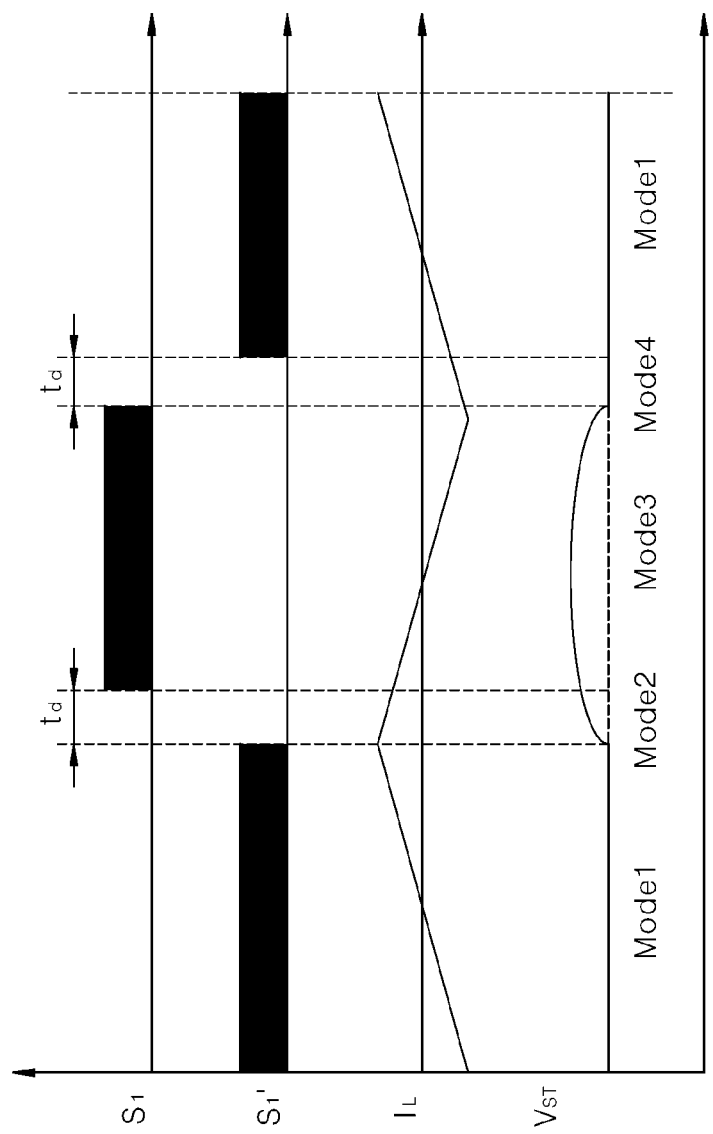
FIG. 12 is a graph showing a current of a charge and discharge inductor and a voltage of a first capacitor based on an operation procedure in FIG. 8 to FIG. 11.

Next, referring to FIG. 11, after a predetermined time has elapsed, the voltage stabilization unit 130 may turn off both the common switching elements S1 and S1' for the dead time $t_d$. Thus, the diode of the second common switching element S1' is electrically conductive. Thus, the current flowing to the power supply stage through the charging and discharging inductor $L_C$ may be reduced. In other words, the magnitude of the current $I_L$ flowing in the direction as shown in the figure may increase.

By forming the path of current through the diode for the dead time $t_d$, the second common switching element S1', which is subsequently turned on, may perform a zero voltage switching operation.

More specifically, the current flowing through the diode may gradually decrease. Thus, before the direction of the current is switched to the positive direction of the second common switching element S1' (the reverse direction of the diode), the voltage applied across the second common switching element S1' may be zero.

When the voltage across the second common switching element S1' is zero, the second common switching element S1' is turned on. Thus, the second common switching element S1' may perform the zero voltage switching operation, thereby reducing the switching loss.

As described above, according to the present disclosure, by stabilizing the DC power supplied from the power supply stage of the distribution system, the system efficiency degradation due to voltage instability as otherwise caused when the load is connected to or removed from the direct current (DC) distribution system may be suppressed. Further, as the peak voltage decreases, a component having a lower rated voltage may be used, which may improve the compatibility of the device.

Further, according to the present disclosure, the stabilizing device is included in the load to drive the motor or relieve instability of the DC voltage generated in a transient period based on the operational mode. Thus, the device may be easily implemented, and two functions may be performed by the single device. Thus, the efficiency of the device may be improved.

Figure 13:
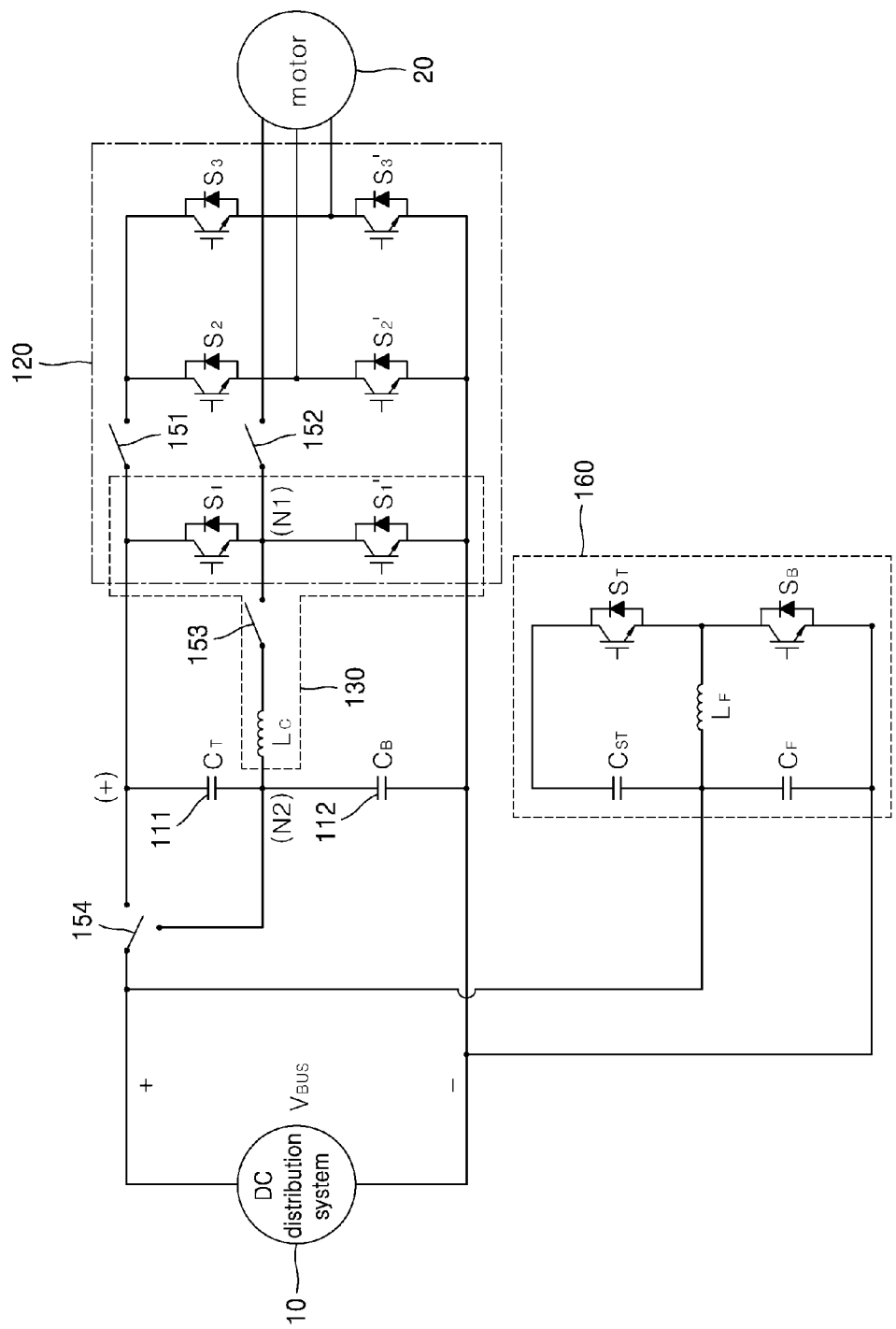
FIG. 13 is a circuit diagram of a device to stabilize the direct current (DC) distribution system with an auxiliary voltage stabilization circuit connected in parallel thereto.

FIG. 13 is a circuit diagram of a device for stabilizing the direct current (DC) distribution system with an auxiliary voltage stabilization circuit connected in parallel thereto.

Referring to FIG. 3 and FIG. 13, the stabilization device according to the present disclosure may further include an auxiliary voltage stabilization unit 160. The auxiliary voltage stabilization unit 160 includes a pair of auxiliary switching elements $S_T$ and $S_B$, a filter inductor LF, a charging and discharging capacitor $C_{ST}$, and a filter capacitor $C_F$.

In this connection, the filter capacitor $C_F$ may mitigate the ripple caused by the switching operation of the auxiliary switching elements $S_T$ and $S_B$. Furthermore, when the auxiliary switching elements $S_T$ and $S_B$ perform turn-on or turn-off operation with a short dead time, the filter inductor $L_F$ may limit the current flow between the power supply stage and the charging and discharging capacitor $C_{ST}$.

The auxiliary voltage stabilization unit 160 is connected in parallel with the power supply stage. Based on an auxiliary charging or discharging signal $S_c'$, the auxiliary voltage stabilization unit 160 charges the DC voltage $V_{BUS}$ supplied from the power supply stage to the charging and discharging capacitor $C_{ST}$ or discharges the voltage charged in the charging and discharging capacitor $C_{ST}$ to the power supply stage.

The auxiliary voltage stabilization unit 160 may operate independently of the operation of the switching unit 150 as described above.

In other words, even when the device 100 for stabilizing the direct current (DC) distribution system is configured as the inverter circuit as shown in FIG. 6 according to the operation of the switching unit 150, the auxiliary voltage stabilization unit 160 may be activated.

Referring again to FIG. 4, to enable the auxiliary voltage stabilization unit 160 as described above, the control unit 140 may compare the DC voltage $V_{BUS}$ supplied from the power supply stage with a reference range and provide an auxiliary charging or discharging signal $S_C'$ to the auxiliary voltage stabilization unit 160 based on the comparison result.

The auxiliary charging or discharging signal $S_C'$ is the same as the charging or discharging signal $S_C$ as described above, and, hence, a detailed description thereof will be omitted.

The auxiliary voltage stabilization unit 160 charges the charging and discharging capacitor $C_{ST}$ using the current stored in the filter inductor $L_F$ or discharges the voltage charged in the charging and discharging capacitor $C_{ST}$ to the power supply stage through the filter inductor $L_F$.

The auxiliary switching elements $S_T$ and $S_B$, filter inductor $L_F$, charging and discharging capacitor $C_{ST}$, and filter capacitor $C_F$ as shown in FIG. 13 respectively perform the same functions as those of the common switching elements S1 and S1', charging and discharging inductor $L_C$, first capacitor $C_T$ and the second capacitor $C_B$.

Accordingly, the operation of the auxiliary voltage stabilization unit 160 may be the same as the operation of the voltage stabilization unit 130 as described with reference to FIGS. 8 to 12.

As described above, the stabilization device according to the present disclosure may selectively activate the driving of the motor 20 and the voltage stabilization operation of the DC distribution system. Further, when the motor 20 is not driven, the stabilization device according to the present disclosure may perform the voltage stabilization operation more effectively by using the capacitors $C_T$ and $C_B$ in the load (for example, a home appliance such as an air conditioner).

Figure 14:
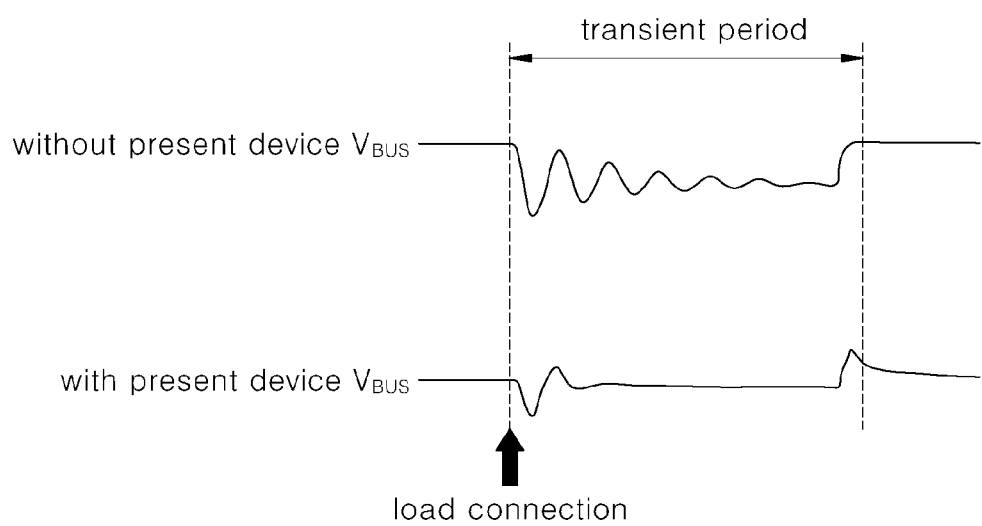
FIG. 14 and FIG. 15 show improved waveforms of the power supply stage voltage in the transient period according to the application of the present disclosure.
Figure 15:
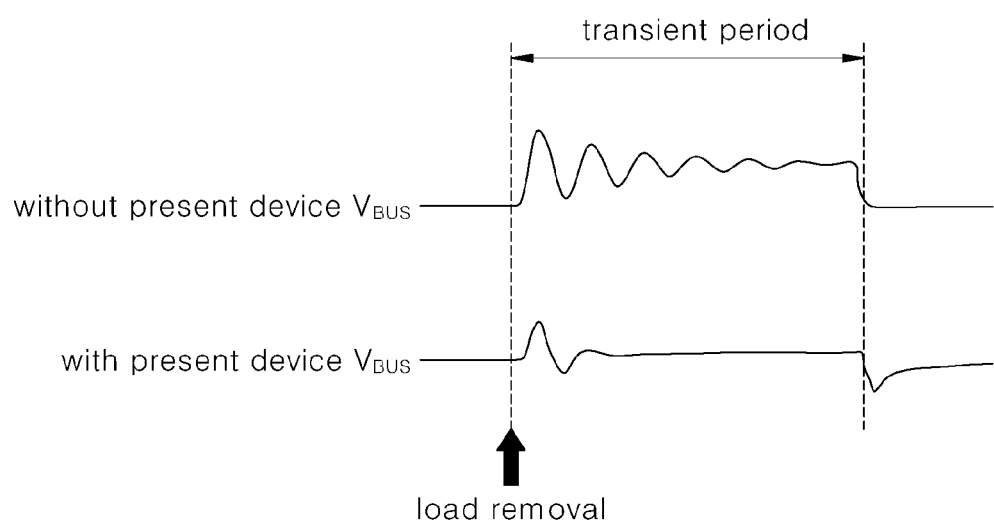

FIG. 14 and FIG. 15 show improved waveforms of the power supply stage voltage in the transient period according to the application of the present disclosure.

Referring to FIG. 14, after the load is connected to the DC distribution system, the voltage instability (voltage drop and oscillation) occurring in the transient period may be mitigated by the discharge operation of the voltage stabilization unit 130. In other words, upon the voltage drop due to the load connection, the voltage stabilization unit 130 may compensate for the voltage drop in the power supply stage by discharging the voltage stored in the first capacitor $C_T$.

Referring to FIG. 15, after the load is removed from the DC distribution system, the voltage instability (voltage rise and oscillation) occurring in the transient period may be alleviated by the charging operation of the voltage stabilization unit 130. In other words, when the voltage increases due to the load removal, the voltage stabilization unit 130 may charge the first capacitor $C_T$ using the increased voltage to compensate for the voltage rise of the power supply stage.

This reduces the peak and oscillation of the power supply stage voltage. Further, the maximum voltage generated in the power supply stage may be limited. Thus, it is possible to use a component having a lower rated voltage.

While the foregoing is directed to the embodiments of the present disclosure, various changes and modifications may be made by those skilled in the art. Accordingly, it is to be understood that such changes and modifications are included within the scope of the present disclosure unless they depart from the scope of the present disclosure.

What is claimed is:

1. A device for stabilizing a direct current (DC) distribution system, wherein the system includes a power supply stage, the device comprising:
   a capacitor unit coupled in parallel with the power supply stage, wherein the capacitor unit is configured to be charged by a DC voltage supplied from the power supply stage;
   an inverter unit including two pairs of driving switching elements and a pair of common switching elements, wherein the inverter unit is configured to convert the voltage charged in the capacitor unit into an AC power and to provide the AC power to a motor connected to the device;
   a voltage stabilization unit configured to control the common switching elements based on a charging or discharging signal to charge the capacitor unit with the DC voltage supplied from the power supply stage or to discharge the voltage charged in the capacitor unit to the power supply stage;
   a switching unit configured to selectively enable the inverter unit or the voltage stabilization unit; and
   a control unit configured to provide the charging or discharging signal to the voltage stabilization unit based on a magnitude of the DC voltage supplied from the power supply stage and to supply a switching signal to the switching unit to control turn-on or turn-off of a plurality of switches included in the switching unit.

2. The device of claim 1, wherein the capacitor unit includes a first capacitor and a second capacitor, wherein the first and second capacitors are coupled in series to each other.

3. The device of claim 2, wherein the switching unit includes:
   a first switch configured for selectively connecting said one pair of common switching elements and the two pair of driving switching elements;
   a second switch configured for selectively connecting a first node between said one pair of common switching elements and the motor;
   a third switch configured for selectively connecting a second node between the first capacitor and the second capacitor and the first node; and
   a fourth switch configured for selectively connecting a positive terminal of the first capacitor or the second node to the power supply stage.

4. The device of claim 3, wherein the switching unit is configured to selectively turn on the first switch and the second switch and turn off the third switch, and to control the fourth switch so that the positive terminal of the first capacitor is selectively connected to the power supply stage, thereby to selectively enable the inverter unit.

5. The device of claim 3, wherein the switching unit is configured to selectively turn off the first switch and the second switch and turn on the third switch, and to control the fourth switch so that the second node is selectively connected to the power supply stage, thereby to selectively enable the voltage stabilization unit.

6. The device of claim 3, wherein the control unit is configured to provide a switching signal corresponding to an operational mode input by a user, and wherein the switching unit is configured to control an operation of the first to fourth switches according to the switching signal.

7. The device of claim 6, wherein when the operational mode is a driving mode, the control unit is configured to provide a first switching signal, and wherein the switching unit configured to turn on the first switch and the second switch and turn off the third switch, and to control the fourth switch according to the first switching signal so that the positive terminal of the first capacitor is selectively connected to the power supply stage, thereby to selectively enable the inverter unit.

8. The device of claim 6, wherein when the operational mode is a voltage stabilization mode, the control unit is configured to provide a second switching signal, and wherein the switching unit configured to turn off the first switch and the second switch and turn on the third switch, and to control the fourth switch according to the second switching signal so that the second node is selectively connected to the power supply stage, thereby to selectively enable the voltage stabilization unit.

9. The device of claim 2, wherein the voltage stabilization unit includes a charging and discharging inductor, wherein the charging and discharging inductor has one end connected to a first node between said one pair of common switching elements and another end connected to a second node between the first capacitor and the second capacitor.

10. The device of claim 9, wherein the voltage stabilization unit is configured to charge the first capacitor with a current stored in the charging and discharging inductor or to discharge the voltage charged in the first capacitor to the power supply stage through the charging and discharging inductor.

11. The device of claim 1, wherein said one pair of common switching elements are configured to perform turn-on or turn-off based on the charging or discharging signal.

12. The device of claim 1, wherein said pair of common switching elements are configured to perform zero voltage switching (ZVS) based on the charging or discharging signal.

13. The device of claim 1, wherein the control unit is configured to receive a measured value of the DC voltage from a voltage sensor, to compare the received measured value with a reference range and to provide the charging or discharging signal to the voltage stabilization unit based on the comparison result.

14. The device of claim 13, wherein when the DC voltage exceeds the reference range, the control unit is configured to provide a charging signal to the voltage stabilization unit, and wherein when the DC voltage is smaller than the reference range, the control unit is configured to provide a discharging signal to the voltage stabilization unit.

15. The device of claim 1, further comprising:
an auxiliary voltage stabilization unit, wherein the auxiliary voltage stabilization unit includes
a pair of auxiliary switching elements,
a filter inductor,
a charging and discharging capacitor, and
a filter capacitor,
wherein the auxiliary voltage stabilization unit is connected in parallel with the power supply stage, and
wherein the auxiliary voltage stabilization unit is configured, based on an auxiliary charging or discharging signal, to
charge the charging and discharging capacitor with the DC voltage supplied from the power supply stage or
to discharge the charged voltage from the charging and discharging capacitor to the power supply stage.

16. The device of claim 15, wherein the control unit is configured to compare the DC voltage supplied from the power supply stage with the reference range, and to provide the auxiliary charging or discharging signal to the auxiliary voltage stabilization unit based on the comparison result.

17. The device of claim 16,
wherein when the DC voltage exceeds the reference range, the control unit is configured to provide an auxiliary charging signal to the auxiliary voltage stabilization unit, and
wherein when the DC voltage is smaller than the reference range, the control unit is configured to provide an auxiliary discharging signal to the auxiliary voltage stabilization unit.

18. The device of claim 15, wherein the auxiliary voltage stabilization unit is configured to charge the charging and discharging capacitor with a current stored in the filter inductor or to discharge a voltage charged in the charging and discharging capacitor to the power supply stage through the filter inductor.

19. The device of claim 1, wherein the control unit is configured to provide a driving signal to the inverter unit, and wherein the driving signal is configured for controlling turning on or off of the two pairs of driving switching elements and the pair of common switching elements.

* * * * *